(12) United States Patent
Chan

(10) Patent No.: US 12,086,487 B1
(45) Date of Patent: Sep. 10, 2024

(54) RESTRICTING PRINTING BASED ON PHYSICAL LOCAL PRESENCE OF A USER DEVICE

(71) Applicant: KYOCERA Document Solutions Inc., Osaka (JP)

(72) Inventor: Sam Chinh Co Tang Chan, Garden Grove, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/124,084

(22) Filed: Mar. 21, 2023

(51) Int. Cl.
*G06F 3/12* (2006.01)

(52) U.S. Cl.
CPC ............ *G06F 3/126* (2013.01); *G06F 3/1236* (2013.01); *G06F 3/1239* (2013.01); *G06F 3/1284* (2013.01); *G06F 3/1292* (2013.01)

(58) Field of Classification Search
CPC ...... G06F 3/126; G06F 3/1236; G06F 3/1239; G06F 3/1284; G06F 3/1292
See application file for complete search history.

(56) References Cited

U.S. PATENT DOCUMENTS

| | | | |
|---|---|---|---|
| 10,754,597 B2 * | 8/2020 | Kobayashi | H04N 1/0048 |
| 2016/0259602 A1 * | 9/2016 | Dalaa | G06F 21/608 |
| 2018/0101348 A1 * | 4/2018 | Ota | H04L 61/2517 |
| 2023/0145977 A1 * | 5/2023 | Kikuchi | G06F 3/1288 |
| | | | 358/1.15 |

* cited by examiner

*Primary Examiner* — John R Wallace
(74) *Attorney, Agent, or Firm* — W. Eric Webostad

(57) ABSTRACT

Systems and methods relating generally to restriction of printing are disclosed. In one such method, a print job is received by a printing device. The printing device initiates a check for locality of a user device with respect to the printing device in response to receipt of the print job. The printing device accesses a local interface thereof. The printing device attempts to establish communication with the user device via the local interface. The user device can be determined to not be found via the local interface. The printing by the user device on the printing device is restricted responsive to the user device being not found via the local interface.

16 Claims, 10 Drawing Sheets

RESTRICTING PRINTING BASED ON PHYSICAL LOCAL PRESENCE OF A USER DEVICE

FIELD

The following description relates to printing. More particularly, the following description relates to restricting printing base on physical local presence of a user device with respect to a printing device.

BACKGROUND

Generally, printers are available to any user device capable of accessing same. However, for a number of printers, some of which may be far away from a user, it can be challenging to know which printer received a print job.

SUMMARY

In accordance with one or more below described examples, a method relating generally to restriction of printing is disclosed. In such a method, a print job is received by a printing device. The printing device initiates a check for locality of a user device with respect to the printing device in response to receipt of the print job. The printing device accesses a local interface thereof. The printing device attempts to establish communication with the user device via the local interface. The user device can be determined to not be found via the local interface. The printing by the user device on the printing device is restricted responsive to the user device being not found via the local interface.

In accordance with one or more below described examples, a system relating generally to restriction of printing is disclosed. In such a system, a printer system has a memory configured to store program code; and a processor coupled to the memory. In combination and response to executing the program code, the printer system is configured to initiate operations for implementing a process for the printing by a user device. In such a process, a print job is received by a printing device. The printing device initiates a check for locality of a user device with respect to the printing device in response to receipt of the print job. The printing device accesses a local interface thereof. The printing device attempts to establish communication with the user device via the local interface. The user device can be determined to not be found via the local interface. The printing by the user device on the printing device is restricted responsive to the user device being not found via the local interface.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3-1 through 3-7 are flow diagrams depicting respective examples of determining locality flows for different types of local interfaces.

FIG. 4 is a pictorial diagram depicting an example of a network.

FIG. 5 is a block diagram depicting an example of a portable communication device.

FIG. 6 is a block diagram depicting an example of a multi-function printer (MFP).

FIG. 7 is a block diagram depicting an example of a computer system.

DETAILED DESCRIPTION

Figure 1:
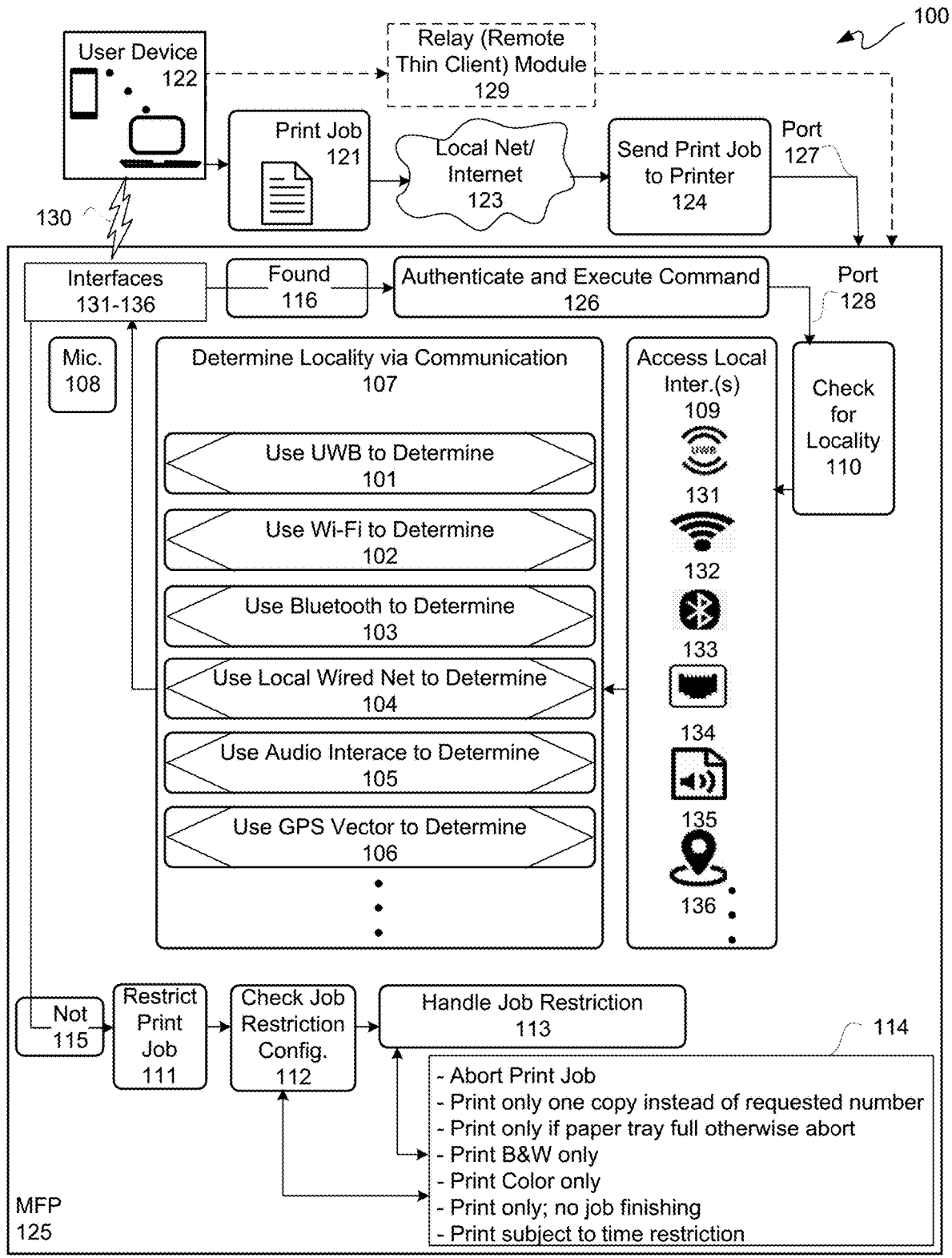
FIG. 1 is a block-flow diagram depicting an example of a printing system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding. \

Various user devices may attempt to connect with a printer for printing. A printer may have many protocols that allow printer access from a remote area via TCP/Socket, HTTP, FTP, or other protocol. However, this is can be problematic because it allows a user mistakenly print via a printer in an unwanted location. Further, this can allow hackers to send print jobs thereby disturbing a printing environment.

As described below in additional detail, printing may be restricted to a personal computer (PC), smart phone, smart tablet, or other user device physically proximate to a printer to be used for such printing. For example, printing may be allowed only around an area defined by an information technology (IT) administrator by using proximity to a printer defined by reception range, which may vary by local interface capabilities, such as reception ranges of Wi-Fi, Bluetooth, GPS, Ultra-wideband, or another local interface.

With the above general understanding borne in mind, various configurations for systems, and methods therefor, for restricting printing based on physical local presence of a user device to a printing device are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a block-flow diagram depicting an example of a printing system 100. Printing system 100 uses a physical local presence of a user device 122 with respect to a printing device 125 for determining whether restricted or unrestricted printing is to be allowed on such printing device 125 by such a user device 122. In this example, printing device 125 is a multi-function printer ("MFP"); however, in other examples other types of printing devices, including a dedicated printer, may be used.

MFP 125 may include one or more local interfaces. In this example, MFP includes the following local interfaces: an ultra-wideband or UWB interface 131, a wireless fidelity or Wi-Fi interface 132, a Bluetooth interface 133, a local wired network or Ethernet interface 134, an audio interface 135, or a Global Positioning System or GPS interface 136. Generally, MFP 125 includes at least two different types of local interfaces. However, one or more of these or one or more other types of local interfaces may be used in other examples.

Additionally, printing system 100 may include a relay module 129. For example, a remote thin client device ("thin client") may have one or more local interfaces for communication with MFP 125, as well as communication with a user device 122. Relay module 129 for example may be a mini-personal computer or mini-pc. Relay module 129 may optionally be used by a user device 122 for communication with MFP 125. However, the following description for communication with a user device 122, though not through a thin client, applies equally to use of a thin client.

Different types of local interfaces may generally have same or different types of data rates and range. Range or distance from an MPF 125 by a user device 122 may thus be different among different types of local interfaces. For example, an Ethernet or other hardwired network connected device may be shorter or greater in connectivity distance than a wireless network connected device depending on network topology. So a user device 122 hardwired to a same subnet as an MFP 125 may be considered local, namely a state of locality with respect to such MFP 125. Furthermore, a user device 122 on a same hardwired intranet, though different subnets, as an MFP 125 may likewise be considered to be in a state of locality with respect to such an MFP 125. In short, this locality is based on a physical touching, such as jacking into an Ethernet port.

However, a mobile device for a user device 122, which may be hardwired or wireless connected to an MFP 125 may go in an out of a state of locality with respect to such an MFP 125. Furthermore, an 802.11n wireless connection may have an indoor range of greater than 200 feet for a performance around 300 Mbps. Bluetooth and UWB may have a reception range of less than 50 feed though UWB may have a 10× greater data rate than Bluetooth. Accordingly, different types of local interfaces may have different reception ranges, where a hardwired connection involves a physical touching. Based on these different distances, one type of local interface may be out-of-range for unrestricted printing, while another type of local interface may be in-range for unrestricted printing, as described below in additional detail.

In this example, a user device 122 is depicted as being either or both a smart phone or a notebook computer. However, other types of user devices 122 capable of sending a print job 121 to an MFP 125 may be used in other examples.

User device 122 may send a print job 121 to a local network or Internet exchange 123. Such an exchange may send 124 such a print job 121 to an MFP 125, or more particularly to a port 127 of an MFP 125. However, an MFP 125 may verify whether such a print job is to be executed as received or restricted by such an MFP 125, as described below in additional detail.

In response to receipt of a print job 121, MFP 125 may initiate a check for locality 110 of such a user device 122 sending such a print job 121. MFP 125 in response to initiating a check for locality 110 may access 109 a local interface, in this example a local interface of local interfaces 131 through 136, of MFP 125.

Which local interface MFP 125 initially selects and subsequent order of selection may vary primarily based on ease of use. However, other factors may be used such as reception distance, data rate, availability, usage rate, or security, among other factors. For purposes of clarity by way of example and not limitation, it shall be assumed that MFP 125 is configured to access 109 from an easiest to most difficult to use local interface, and then from highest to lowest data rate second. However, other access or selection algorithms may be used for access 109. An easiest access may be an Ethernet connection, next may be a UWB connection, and then followed in order by a Wi-Fi, Bluetooth, audio, and GPS connection.

At 107, MFP 125 may be configured to determine locality of a user device 122 via establishment, or not, of communication with such user device 122 via such an accessed local interface. In this example, MFP 125 is configured with routines 101 through 106 corresponding to local interfaces 131 through 136. For example, if determining locality via communication of a selected UWB interface 131 is to be performed, then a routine 101 for using UWB to determine locality of a user device 122 to MFP 125 may be used. Accordingly, routine 102 is for using Wi-Fi to determine locality of a user device 122; routine 103 is for using Bluetooth to determine locality of a user device 122; routine 104 is for using a local hardwired network, such as Ethernet for example, to determine locality of a user device 122; routine 105 is for using an audio interface to determine locality of a user device 122; and routine 106 is for using a GPS vector to determine locality of a user device 122.

Using a selected routine at 107 for determining locality by at least attempting communication with a user device 122, MFP 125 may initiate such attempted communication 130 via a selected interface of interfaces 131 through 136. If such attempted communication 130 with a user device 122 is successful, then such communication may be used to indicate a user device 122 was found 116. If such attempted communication 130 with a user device 122 is unsuccessful, then such lack of communication may be used to indicate a user device 122 was not found 115.

If a user device 122 is found 116, then a print job 121 may be authenticated at 126 and have a print command or commands therefor executed at 126. This information may be provided via an internal port 128 of MFP 125 in contrast to an externally facing port 127 for receiving a print job 121.

If, however, a user device 122 is not found 115, then MFP 125 may restrict printing of a print job 121 at 111. MFP 125 may check a job restriction configuration 112 and handle such a job restriction at 113 in accordance with a restriction on such print job 121. Different types of restrictions may be used, and these may vary according to information obtained via attempts to determine locality at 107. So for example, a job restriction configuration at 112 may inform a job restriction handler at 113 which restriction of restrictions 114 to impose. As used herein, a restriction can be a complete blockage of printing, such as aborting a print job. However, as used herein a restriction or restricting may be a limitation on printer functions or capabilities. Restrictions 114 may be stored in nonvolatile memory and may be configured at 112 for forming a store of restrictions, which may depend up various factors, including print job parameters.

In this example, restrictions 114 include: abort print job; print only one copy instead of a request number of multiple copies; print only if a paper tray of a printing device is full otherwise abort print job; print in black and white only; print in color only; print only without any finishing (e.g., stapling, folding, or other finishing); or print subject to time restriction (e.g., print only after work hours, print only in morning work hours, print only in afternoon work hours, or other time restriction). However, in other example one or more of these or other restrictions may be used.

For an audio interface 135, MFP 125 may be configured with a microphone 108. Microphone 108 may be used for listing for an audio tone, sound or other audio played from an audio file provided via an audio interface 135.

Figure 2:
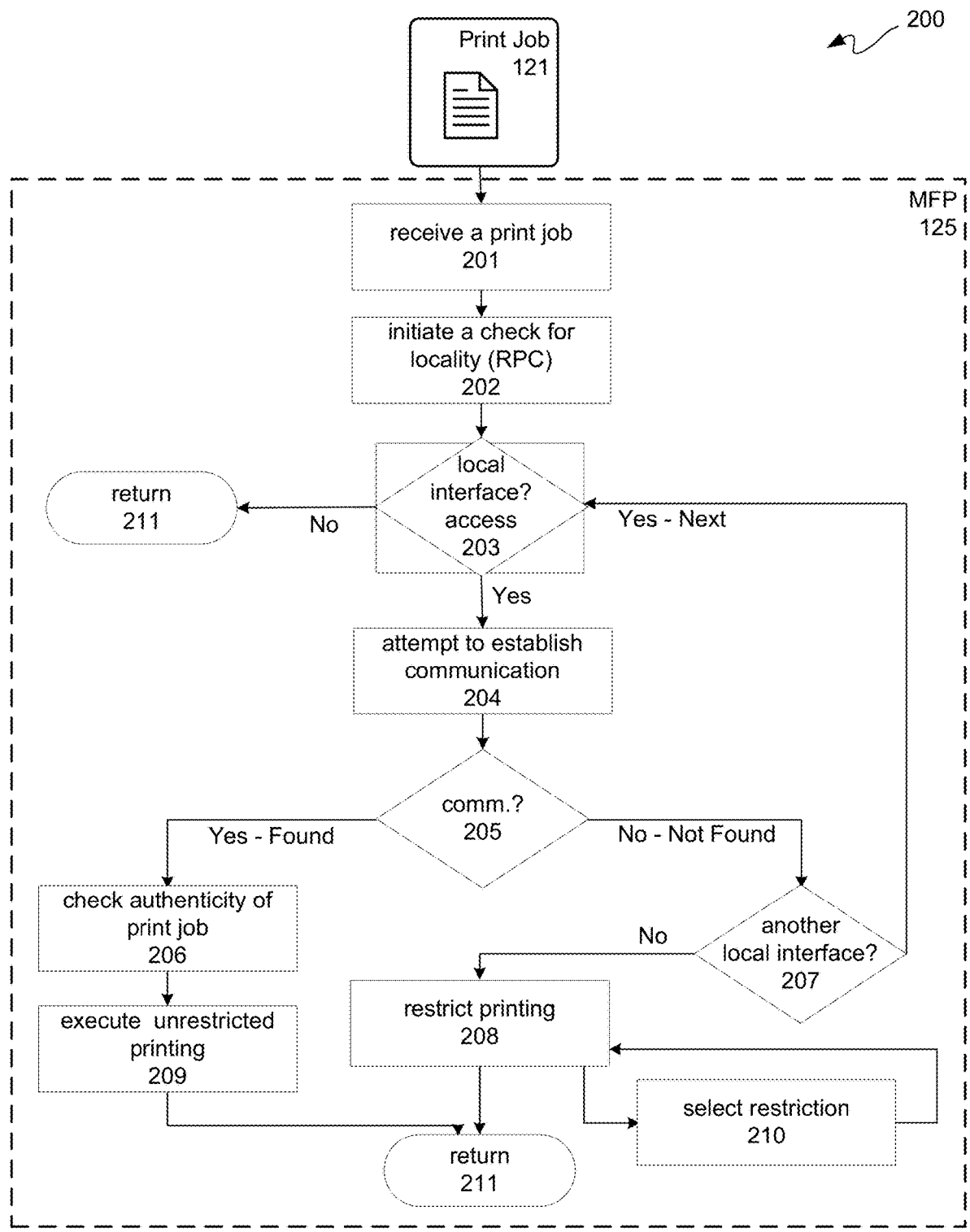
FIG. 2 is a flow diagram depicting an example of a restricted printing flow.

FIG. 2 is a flow diagram depicting an example of a restricted printing flow 200. Restricted printing flow 200 is based on physical local presence of a user device 122 with respect to a network of MFP 125, as previously described with reference to FIG. 1. Restricted printing flow 200 is further described with simultaneous reference to FIGS. 1 and 2.

At 201 a print job 121 may be received by an MFP 125 or other printing device. At 202, MFP 125 may be configured, such as programmed, to initiate a check for locality of a user device with respect to such MFP 125 in response to receipt of print job 121. This check may be for determining locality of a user device 122 as a Remote Print Client (RPC).

At 203, it may be determined by MFP 125 if there is a local interface to access. If such a local interface of MFP 125 is available for access, then same may be accessed at 203. If there is not local interface to access, then restricted printing flow 200 may return at 211.

After accessing by MFP 125 a local interface of local interfaces 131 through 136 for example, then at 204 MFP 125 may attempt to establish communication with a user device 122 via such local interface. At 204, MFP 125 may determine whether a user device is found or not found for purposes of communication via such a local interface.

If a user device is found as determined at 205, then at 206 such communication may be used to determine authenticity of a print job 121 having originated from such a user device 122 found. After authenticating, at 209 a print job may be executed with unrestricted, in comparison to restricted, printing. After printing a print job 121, restricted printing flow 200 may return at 211. So, generally a print job may be executed for printing by user device as unrestricted on a printing device responsive to such user device being found via communication through a local interface and such print job being authenticated.

If a user device is not found as determined at 205, then at 207 a check for another local interface, such as of interfaces 131 through 126, may be performed. If another local interface may be tried, then access to such other local interface may be granted at 203, as previously described. If, however, there is no other local interface to try as determined at 207, then at 208 restricted printing may be instituted. After cycling through a plurality of local interfaces for communication with user device 122 by MFP 125, effectively such a user device 122 may be determined not to be in a locality of such an MFP 125 as none of local interfaces were able to be used to communicate with such user device.

At 210 a restriction may be selected for such restricted printing, such as a restriction of restrictions 114, and such selected restriction may be imposed for restricted printing 208, which can include aborting print job 121. Aborting a print job 121 may include deleting same. After aborting of, limited printing or, or other restriction on a print job 121 at 208, restricted printing flow 200 may return at 211.

FIGS. 3-1 through 3-7 are flow diagrams depicting respective examples of determining locality flows 300, 310, 315, 320, 325, 330, and 340, respectively. Determining locality flows may be examples of selectable routines at 107 of FIG. 1 useable for respectively selected local interfaces, as described below in additional detail with simultaneous reference to FIGS. 1 through 3-7.

Figures 1, 3:
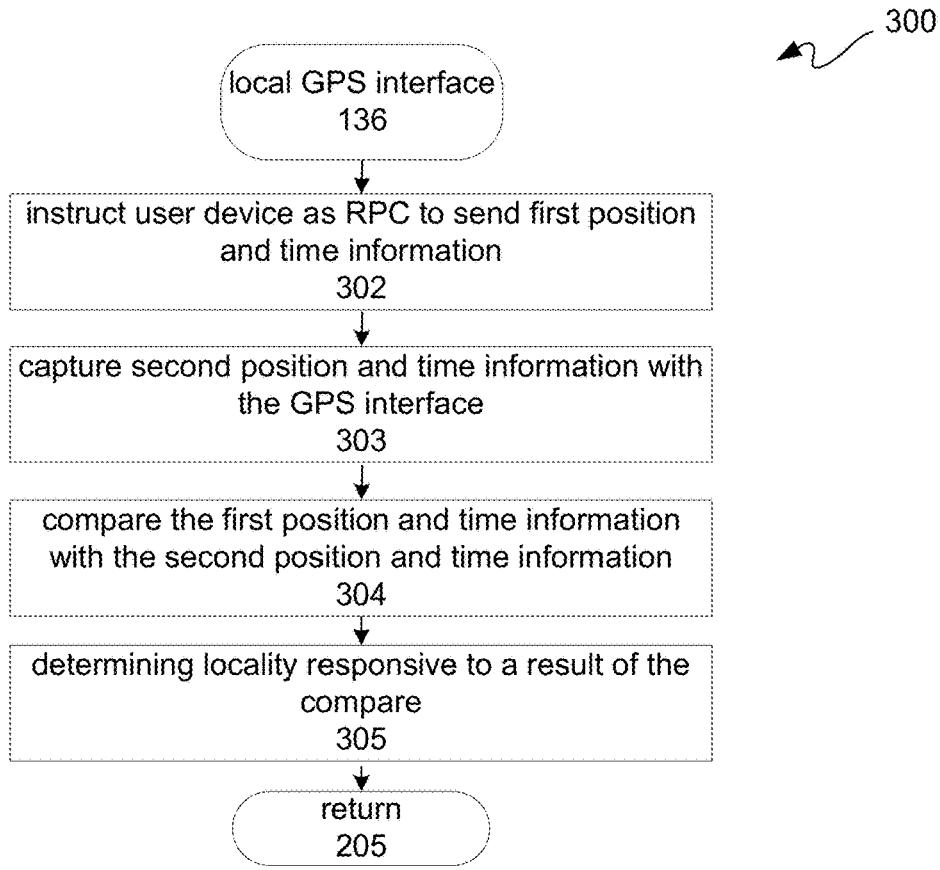
Figures 2, 3:
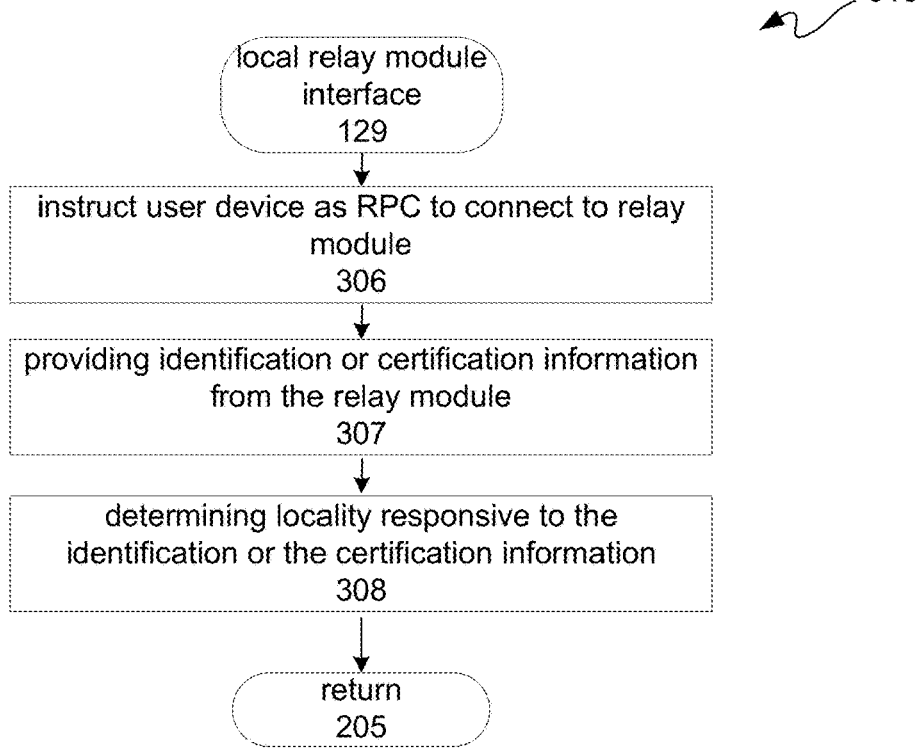
Figure 3:
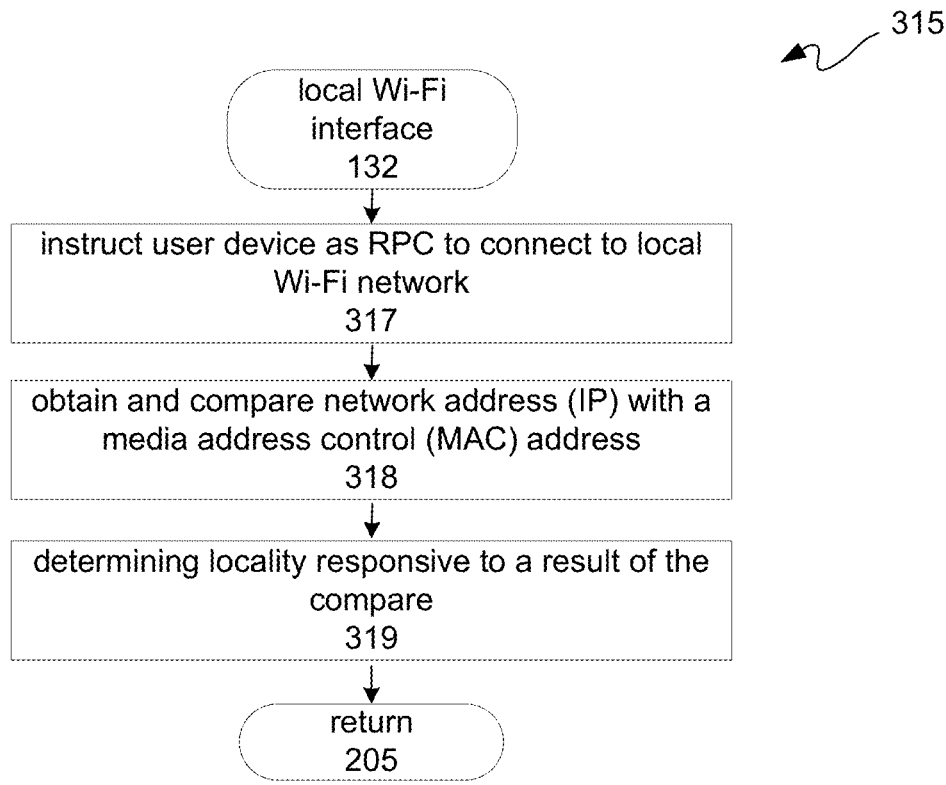

FIG. 3-1 depicts an example of a determining locality flow 300 for when a local interface selection is a GPS interface 136. At 302, a user device 122 as an RPC may be instructed to send GPS position and time information of such user device to MFP 125. At 303, MFP 125 may capture or obtain a set of GPS position and time information from a local GPS interface for MFP 125. At 304, these two sets of GPS position and time information, namely respectively of a user device 122 and an MFP 125, may be compared with one another to determine respective differences.

At 305 locality of a user device 122 with respect to MFP 125 may be determined responsive to a result, such as differences in position and time between GPS data sets for such user device and such MFP, of an associated comparing at 304. For example, if either a difference in position or time is outside of a threshold for locality, such as indicating for example further than 10 meters away, then a not found result may be stored. If, however, differences in position and time for GPS data sets are both within threshold amounts, such as indicating for example a user device in association with a print job 121 is within a 10 meter range of MFP 125, then a found result may be stored. After determining user device 122 is local or not to MFP 125, determining locality flow 300 may return to operation 205.

FIG. 3-2 depicts an example of a determining locality flow 310 for when a local interface selection is a relay module interface 129. At 306, a user device 122 as an RPC may be instructed to connect to a relay module 129, such as a thin client, in communication with MFP 125. This may be used to ensure that such a user device is local to such an MFP 125.

At 307, MFP 125 may be provided with identification or certification information from such relay module 129. This identification or certification information may identify and certify a user device 122 to MFP 125 relayed via relay module 129.

At 308 locality of a user device 122 with respect to MFP 125 may be determined responsive to receipt of such identification or certification information, which information may be used in determining authenticity at 206 as previously described. After determining user device 122 is local or not to MFP 125, determining locality flow 310 may return to operation 205.

FIG. 3-3 depicts an example of a determining locality flow 315 for when a local interface selection is a Wi-Fi interface 132. At 317, a user device 122 as an RPC may be instructed to connect to a local Wi-Fi network including MFP 125. This may be used to ensure that such a user device 122 is local to such an MFP 125.

At 318, MFP 125 may obtain a network address (IP) of such user device RPC and a media address control (MAC) address of a router on such local Wi-Fi network. At 318, MFP 125 may compare such an obtained network address (IP) of such user device RPC with such a media address control (MAC) address of such a router on such local Wi-Fi network.

At 319 locality of a user device 122 with respect to MFP 125 may be determined responsive to a result of such comparison at 318. After determining user device 122 is local or not to MFP 125, determining locality flow 315 may return to operation 205.

Figures 3, 4:
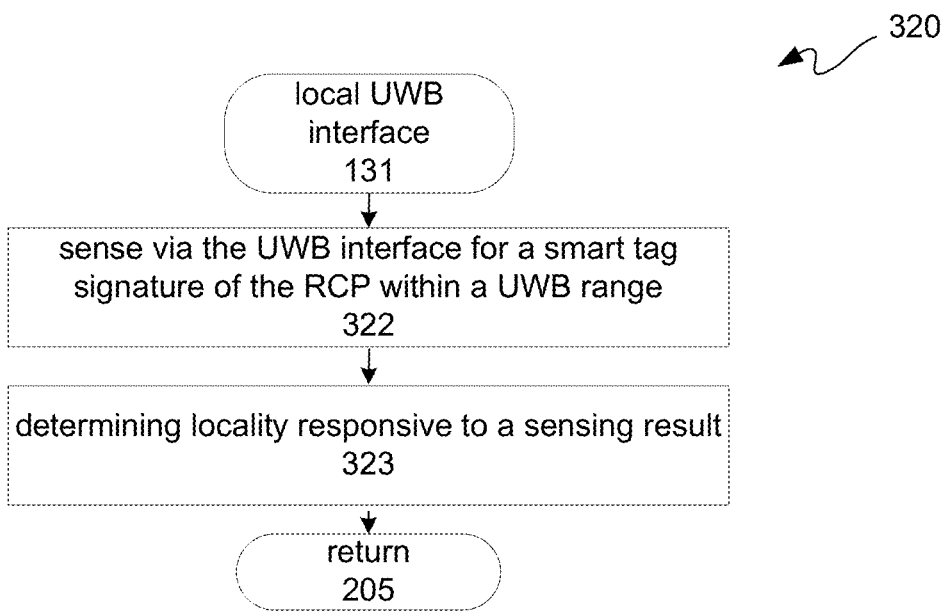

FIG. 3-4 depicts an example of a determining locality flow 320 for when a local interface selection is an UWB interface 131. At 322, MFP 125 may sense via UWB interface 131 thereof for a smart tag signature of a user device 122 as an RCP within a UWB range of such UWB interface. At 323 locality of a user device 122 with respect to MFP 125 may be determined responsive to a result of such sensing at 322. After determining user device 122 is local or not to MFP 125, determining locality flow 320 may return to operation 205.

Figures 3, 4, 5:
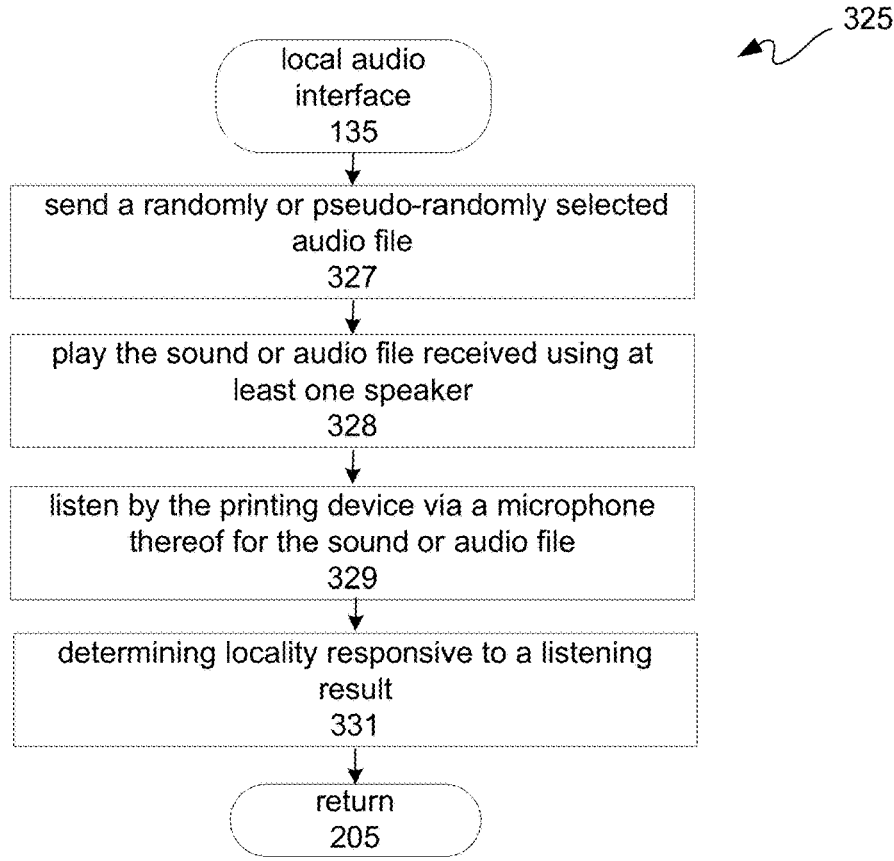

FIG. 3-5 depicts an example of a determining locality flow 325 for when a local interface selection is an audio interface 135. At 327, MFP 125 may send to a user device 122 as an RPC a randomly or pseudo-randomly selected audio file. At 328, user device 122 may play such audio file received using at least one speaker of such user device. At 329, MFP 125 may listen via a microphone 108 thereof for the playing of such audio file. At 331, MFP 125 may determine locality of user device 122 with respect to MFP 125 responsive to a result of such listening, namely comparing sound information obtained via microphone 108 to such source audio file sent for a match with a sufficient probability. If a probability threshold of for example at least 90% match is determined, then user device 122 may be considered found; and if a probability threshold of for example less than 90% match is determined, then user device 122 may be considered not found. After determining user device 122 is local or not to MFP 125, determining locality flow 325 may return to operation 205.

FIG. 3-6 depicts an example of a determining locality flow 330 for when a local interface selection is a hardwired interface 134, such as an Ethernet, fiber optic, or other hardwired interface. At 333, a user device 122 as an RPC may be instructed to connect to a local wired network including MFP 125. For example, a subnet to which MFP 125 is connected may be used for such connection of user device 122.

At 334, MFP 125 may obtain a network address (IP) of such user device RPC and a media address control (MAC)

address of a router on such subnet or other portion of such local wired network. At 334, MFP 125 may compare such an obtained network address (IP) of such user device RPC with such a media address control (MAC) address of such a router on such local wired network.

At 335 locality of a user device 122 with respect to MFP 125 may be determined responsive to a result of such comparison at 334. After determining user device 122 is local or not to MFP 125, determining locality flow 330 may return to operation 205.

FIG. 3-7 depicts an example of a determining locality flow 340 for when a local interface selection is a Bluetooth interface 133. At 342, a user device 122 as an RPC may be instructed to pair with Bluetooth interface 133 for communication with MFP 125. At 343, pairing may be attempted between such user device 122 and MFP 125. This may be used to ensure that such a user device is local to such an MFP 125.

At 344, MFP 125 may be provided by user device 122 with identification information, verification information (e.g., code), or certification information from such user device 122. After pairing, this MFP obtained identification, verification, or certification information may identify, verify, or certify a user device 122 paired with MFP 125.

At 345 locality of a user device 122 with respect to MFP 125 may be determined responsive to receipt of such identification, verification, or certification information, which information may be used in determining authenticity at 206 as previously described. After determining user device 122 is local or not to MFP 125, determining locality flow 340 may return to operation 205.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

FIG. 5 is a block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS.

One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WI-FI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figures 3, 4, 5, 6:
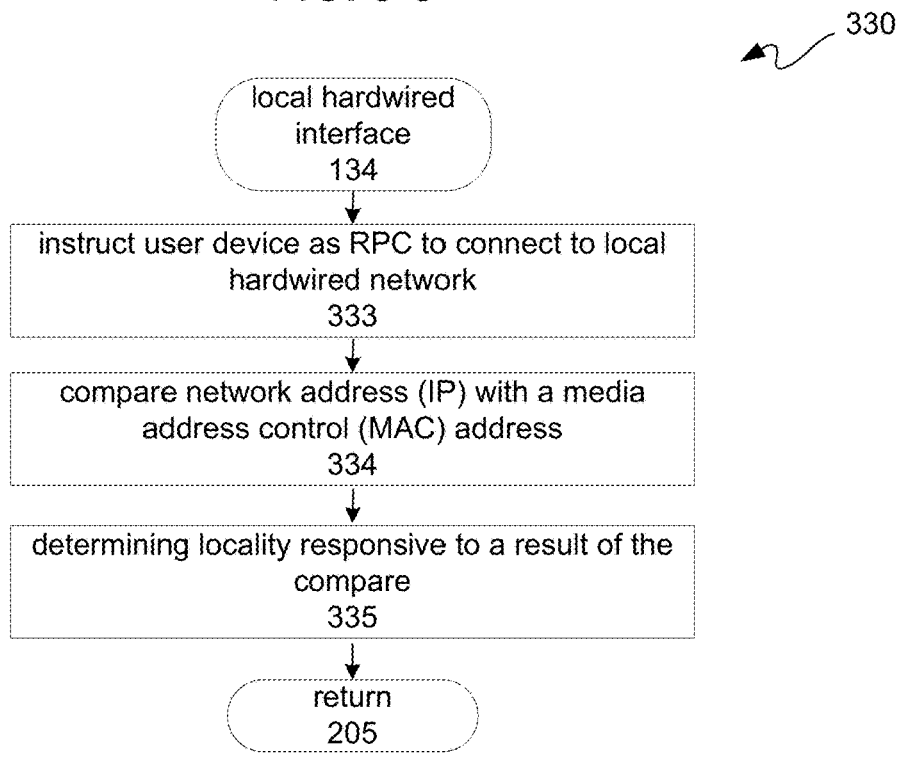

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices. Communication unit 604 may include two or more local interfaces, such as of local interfaces 131 through 136 of FIG. 1. Control unit 601 may include a CPU 611, an image processing unit 612, and cache memory 613.

Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figures 3, 4, 5, 6, 7:
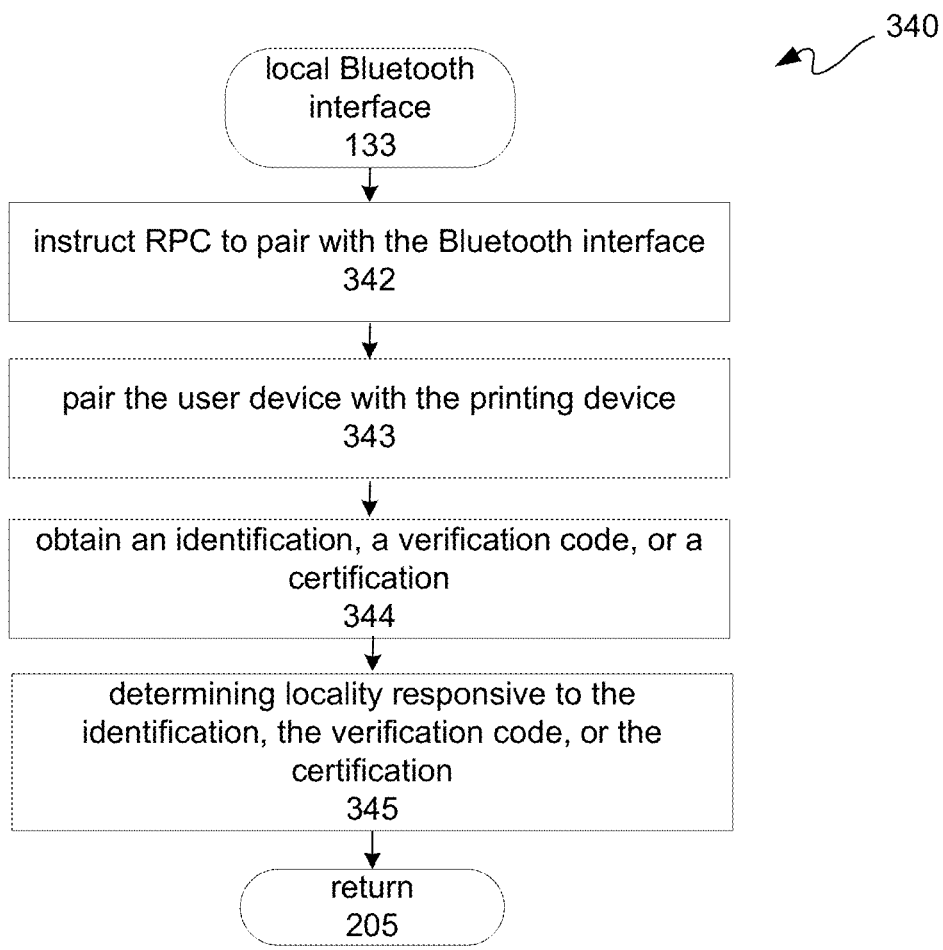
Figure 4:
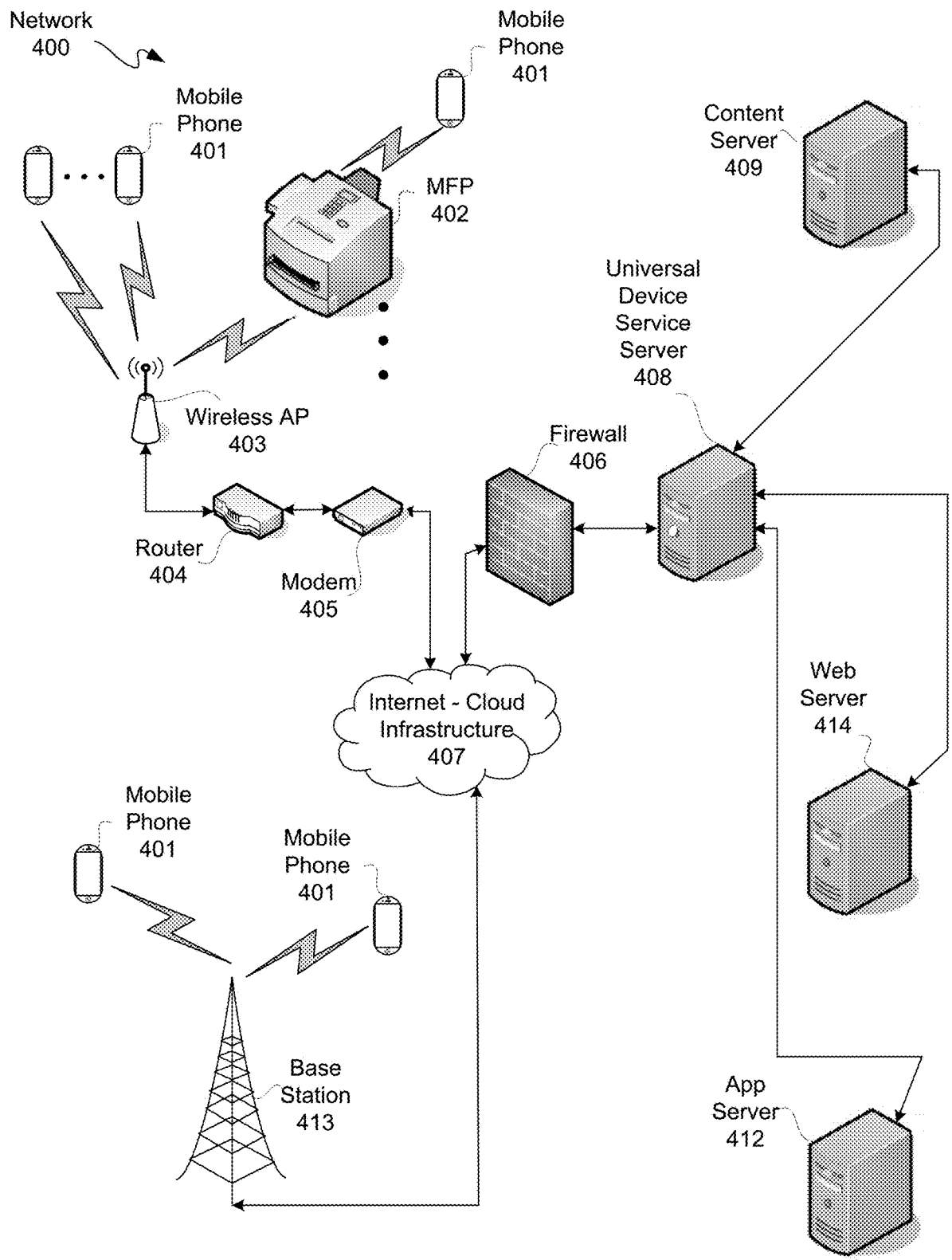
Figure 5:
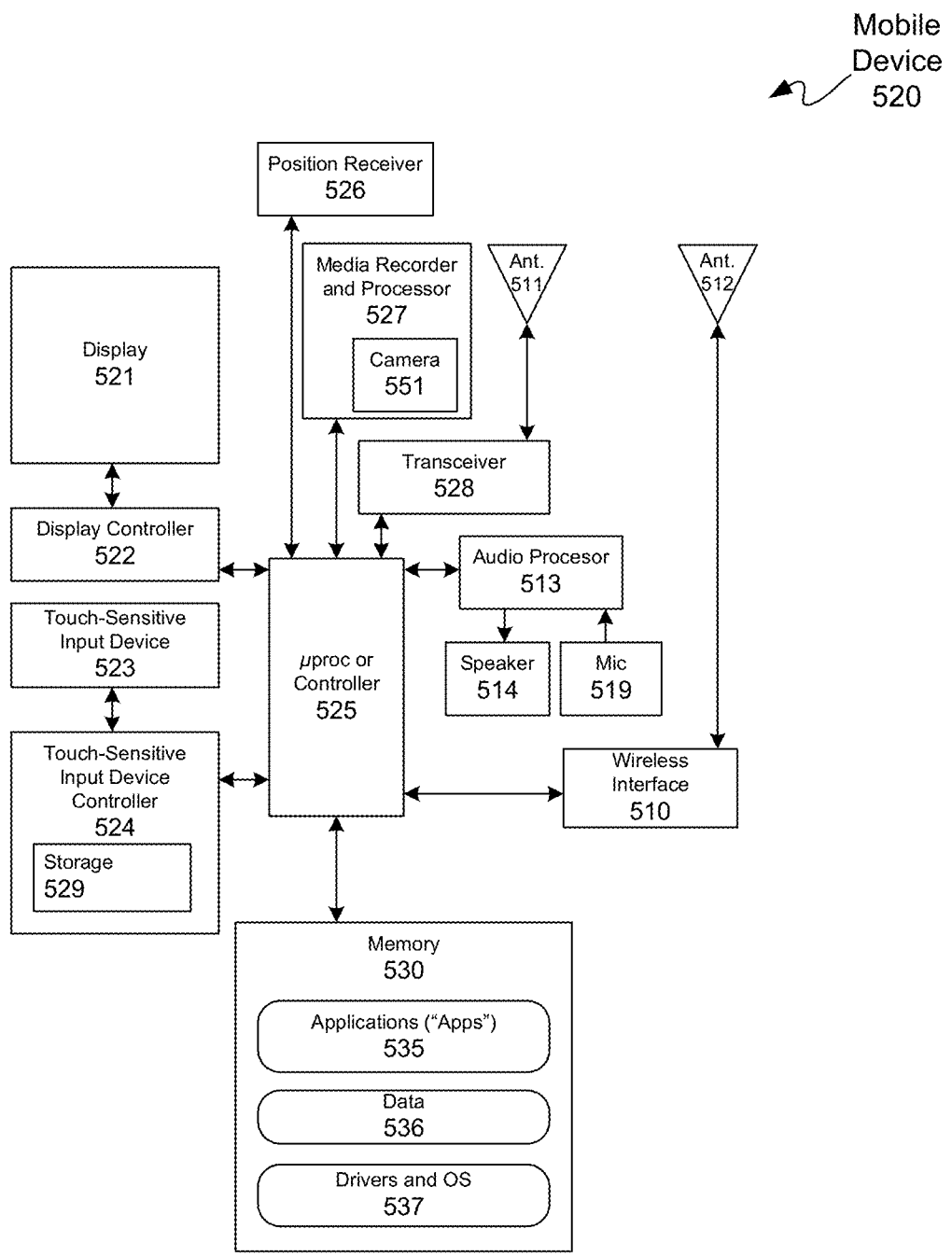
Figure 6:
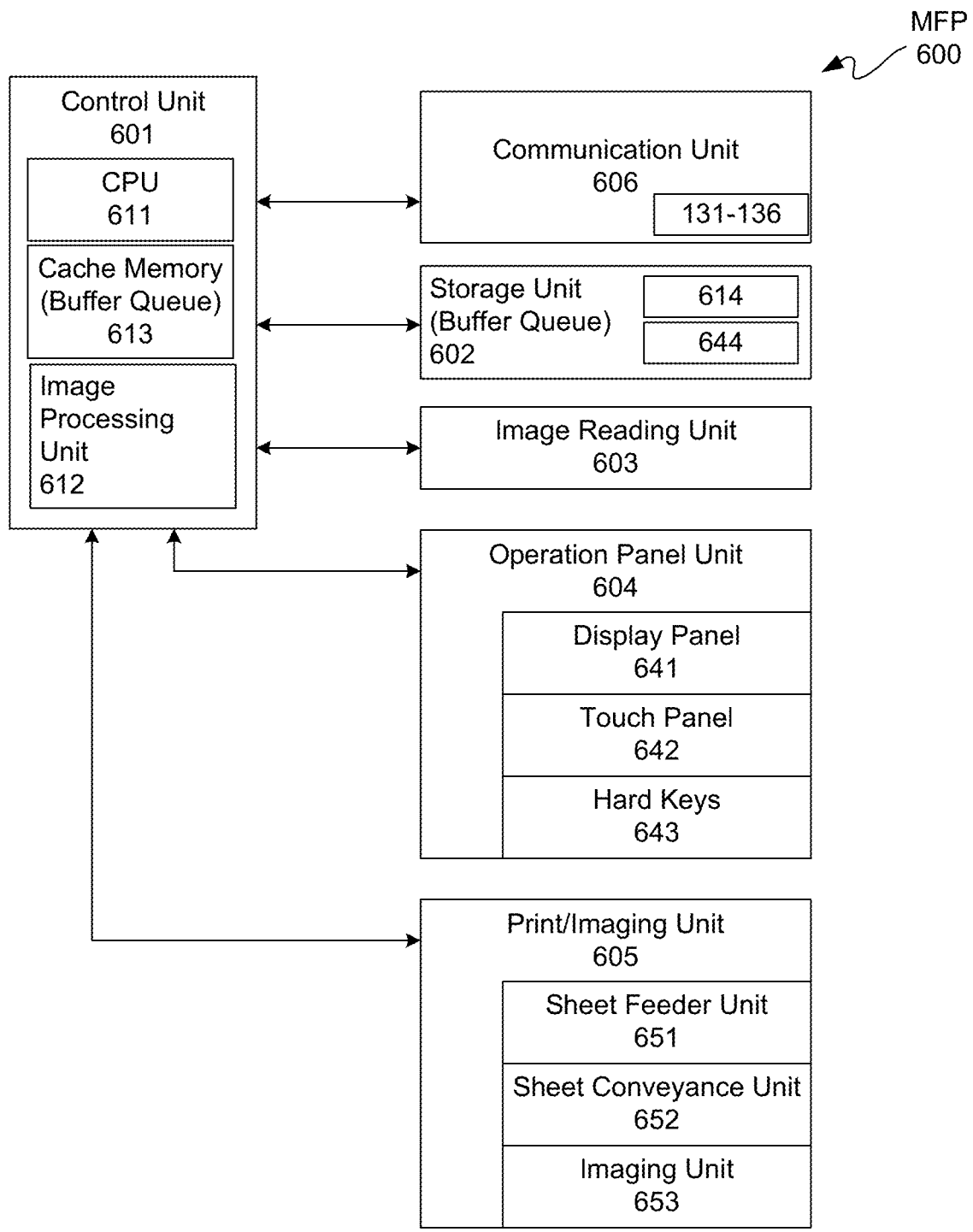
Figure 7:
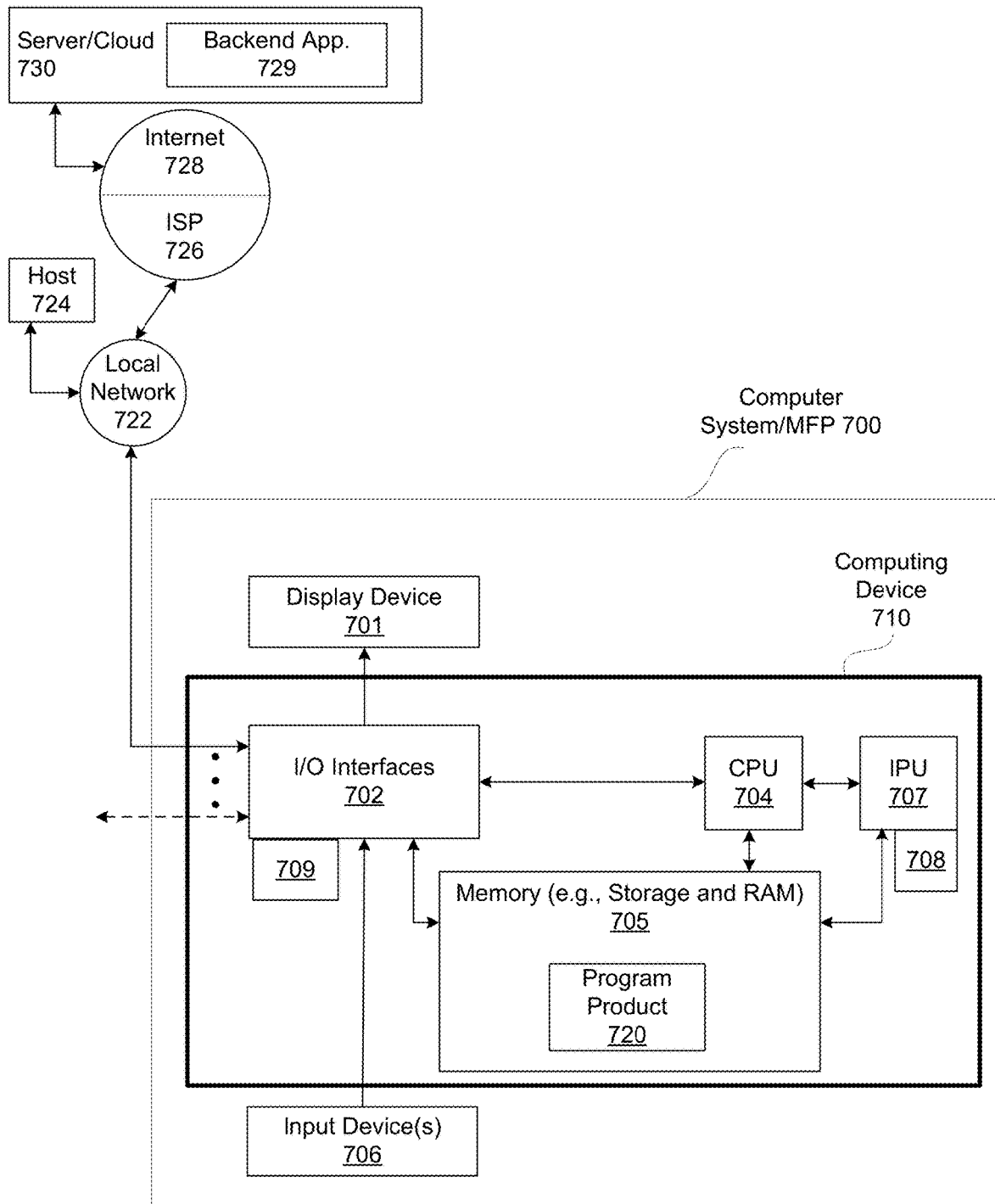

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WI-FI (such as IEEE 802.11a, IEEE 802.11b, IEEE 802.11g and/or IEEE 802.11n), Bluetooth, Wi-MAX, voice over Internet Protocol (VOIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WI-FI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for printing, comprising:
    receiving a print job by a printing device;
    initiating by the printing device a check for locality of a user device with respect to the printing device in response to receipt of the print job;
    accessing by the printing device a first local interface thereof;
    attempting by the printing device to establish communication with the user device via the first local interface;
    determining the user device not found via the first local interface;
    restricting the printing by the user device on the printing device responsive to the user device being not found via the first local interface;
    cycling through a plurality of local interfaces, including the first local interface, of the printing device for communication with the user device;
    accessing by the printing device a second local interface;
    attempting by the printing device to establish communication with the user device via the second local interface;
    determining the user device found via the second local interface;
    checking authenticity of the print job as being from the user device; and
    executing the printing by the user device as unrestricted on the printing device for the print job responsive to the user device being found via the second local interface and the print job being authenticated.

2. The method according to claim 1, wherein the plurality of local interfaces include two or more of an ultra-wideband interface, a wireless fidelity interface, a Bluetooth interface, a local wired network, an audio interface, or a Global Positioning System interface.

3. The method according to claim 1, wherein the check is for the user device as a Remote Print Client (RPC).

4. The method according to claim 3, wherein the local interface is a Global Positioning System (GPS) interface, the method further comprising:
    instructing the user device as the RPC to send first position and time information for the user device to the printer device;
    capturing second position and time information with the GPS interface for the printing device;
    comparing the first position and time information of the user device with the second position and time information of the printing device; and
    determining locality of the user device with respect to the printing device responsive to a result of the comparing.

5. The method according to claim 3, wherein the local interface is coupled for communication with a thin client device external to the printing device, the method further comprising:
    instructing the user device as the RPC to connect to the thin client device proximate and external to the printing device;
    providing identification or certification information for the user device from the thin client to the printing device; and
    determining locality of the user device with respect to the printing device responsive to the identification or the certification information.

6. The method according to claim 3, wherein the local interface is an ultra-wideband (UWB) interface, the method further comprising:
    sensing by the printing device via the UWB interface thereof for a smart tag signature of the RCP within a UWB range of the UWB interface; and determining locality of the user device with respect to the printing device responsive to a result of the sensing.

7. The method according to claim 3, wherein the local interface is an audio interface, the method further comprising:
sending to the user device as the RPC a randomly or pseudo-randomly selected audio file to the user device;
playing by the user device the audio file received using at least one speaker of the user device;
listening by the printing device via a microphone thereof for the playing of the audio file; and
determining locality of the user device with respect to the printing device responsive to a result of the listening.

8. The method according to claim 3, wherein the local interface is a hardwired interface, the method further comprising:
instructing the user device as the RPC to connect to a local wired network including the printing device;
comparing by the printing device a network address of the RPC with a media address control address of a router on the local wired network; and
determining locality of the user device with respect to the printing device responsive to a result of the comparing.

9. The method according to claim 8, wherein the hardwired interface is an Ethernet interface.

10. The method according to claim 3, wherein the local interface is a Bluetooth interface, the method further comprising:
instructing the user device as the RPC to pair with the Bluetooth interface of the printing device;
pairing the user device with the printing device;
obtaining by the printing device an identification, a verification code, or a certification of the user device after the pairing therewith; and
determining locality of the user device with respect to the printing device responsive to the identification, the verification code, or the certification.

11. The method according to claim 1, further comprising configuring a restriction of the printing.

12. The method according to claim 11, wherein the restriction is configurable for aborting the print job.

13. The method according to claim 12, wherein the restriction is further configurable for limiting the printing to: only one copy; only executing when a paper tray of the printing device is full; only black and white; only color; exclude stapling; exclude folding; exclude sorting; or only non-work hours.

14. A system, comprising:
a printer system having:
a memory configured to store program code;
a processor coupled to the memory; and
wherein, in combination and response to executing the program code, the printer system is configured to initiate operations for implementing a process for printing by a user device, the process including:
receiving a print job by a printing device;
initiating by the printing device a check for locality of the user device with respect to the printing device in response to receipt of the print job;
accessing by the printing device a first local interface thereof;
attempting by the printing device to establish communication with the user device via the first local interface;
determining the user device not found via the first local interface; and
restricting the printing by the user device on the printing device responsive to the user device being not found via the first local interface;
accessing by the printing device a second local interface;
attempting by the printing device to establish communication with the user device via the second local interface;
determining the user device found via the second local interface;
checking authenticity of the print job as being from the user device; and
executing the printing by the user device as unrestricted on the printing device for the print job responsive to the user device being found via the second local interface and the print job being authenticated.

15. The system according to claim 14, wherein the plurality of local interfaces include two or more of an ultra-wideband interface, a wireless fidelity interface, a Bluetooth interface, a local wired network, an audio interface, or a Global Positioning System interface.

16. A method for printing, comprising:
receiving a print job by a printing device;
initiating by the printing device a check for locality of a user device with respect to the printing device in response to receipt of the print job;
wherein the check is for the user device as being a Remote Print Client (RPC);
accessing by the printing device a local interface thereof, wherein the local interface is a wireless fidelity (Wi-Fi) interface;
attempting by the printing device to establish communication with the user device via the local interface;
determining the user device not found via the local interface;
restricting the printing by the user device on the printing device responsive to the user device being not found via the local interface;
instructing the user device as the RPC to connect to a local Wi-Fi network including the printing device;
comparing by the printing device a network address of the RPC with a media address control address of a router on the local Wi-Fi network; and
determining locality of the user device with respect to the printing device responsive to a result of the comparing.

* * * * *